Patented May 15, 1923.

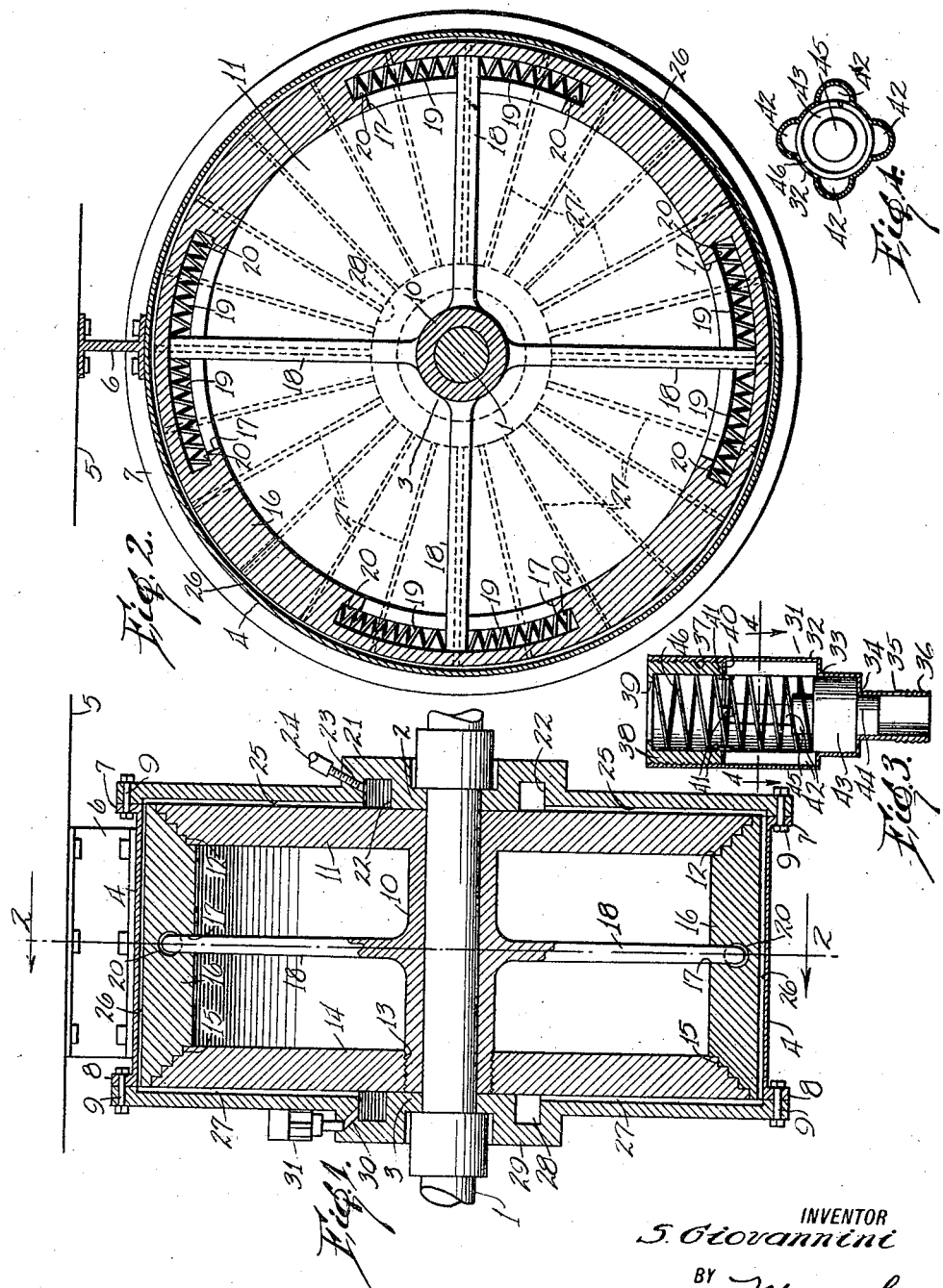

1,454,887

UNITED STATES PATENT OFFICE.

SEBASTIAN GIOVANNINI, OF CHICAGO, ILLINOIS.

FRICTIONLESS AIR BRAKE.

Application filed September 6, 1921. Serial No. 498,621.

*To all whom it may concern:*

Be it known that I, SEBASTIAN GIOVANNINI, a subject of the King of Italy, and a resident of Chicago, in the county of Cook and State of Illinois, have invented a new and useful Improvement in Frictionless Air Brakes, of which the following is a full, clear, and exact description.

My invention relates to improvements in brakes, and it consists in the combinations, constructions and arrangements herein described and claimed.

An object of my invention is to provide a device for checking the speed of a vehicle or machine without subjecting any moving part of the vehicle or machine to a friction that would tend to cause wear on the moving part.

A further object of my invention is to provide a device of the character described in which the braking action is occasioned by passing a pressure fluid between two relatively moving parts.

A further object of my invention is to provide a device of the character described that is simple in construction and not likely to get out of order easily.

Other objects and advantages will appear in the following specification and the novel features of the invention will be more particularly pointed out in the appended claims.

My invention is illustrated in the accompanying drawings forming part of this application, in which—

Figure 1 is a central vertical section, showing the device applied to a rotatable shaft.

Figure 2 is a section along the line 2—2 of Figure 1,

Figure 3 is a sectional detail of a relief valve embodied in the device, and

Figure 4 is a section along the line 4—4 of Figure 3.

When braking devices of which I am aware are employed to check or stop the movements of vehicles and machines, the friction applied results in wear on the parts of the vehicle or machine at which the friction is applied and in consequence, such parts must be frequently replaced. When my invention is carried into effect, the braking action is obtained without the application of such a friction to a moving part as will tend to cause wear on that part.

Referring now to the drawings, 1 denotes a rotatable shaft journalled in bearings 2 and 3. The latter have the form of disks connected by means of a cylinder 4 suspended from a fixed support 5 by means of a hanger 6. It will be observed that the cylinder 4 is formed with annular flanges 7 and 8 at its ends and that these flanges are secured to the disks 2 and 3 by means of bolts 9, or the like, whereby an air-tight cylindrical outer casing is provided.

Arranged to rotate in the cylindrical chamber defined by the cylinder 4 and the disks 2 and 3 is a rotor. This rotor embodies a hub 10 rigidly mounted on the shaft 1 and provided at one end with an integral disk portion 11. The peripheral wall of the disk portion 11 is "stepped" diametrically, as indicated at 12, the diameter thereof being greatest adjacent to its outer face.

The hub 10 is threaded exteriorly adjacent to its other end, as at 13, for engagement with a disk 14 that is identical in essential respects with the disk portion 11 and is fashioned with its peripheral wall "stepped" diametrically, as at 15, in a manner the reverse of that in which the disk portion 11 is fashioned. A cylindrical rim member 16 is concentric with the cylinder 4 and is revolubly supported on the disk portion 11 and the removable disk 14 of the rotor, being formed at its ends to have a sliding fit with the "stepped" peripheral walls of the disk portion 11 and the disk 14. The rim member 16 is provided with a plurality of recesses in its inner wall. In the present instance, I have provided four of these recesses, which are spaced equal distances apart and a spoke or radial arm 18, integral with the hub 10 intermediate of the length of the latter, is provided for each recess 17 and is arranged with its extremity projected into the latter. A pair of contractile springs 19—19 seated in sockets 20—20 in the end walls of each recess are arranged to react against the spoke or radial arm 18 at diametrically opposed points, whereby the outer end of the spoke member will be maintained in a position intermediate the ends of the recess when the device is inactive.

It is to be noted at this point that the rim member is permitted to move relatively to the hub 10 and to the disk portion 11 and the disk 14 within certain limits and that the fit of the rim member 16 with the disk portion 11 and the disk 14 is such as to preclude the passage of a fluid between the contiguous surfaces of these parts.

The disk 2 is fashioned with an annular offset portion 21 concentric with and adjacent to the shaft 1, thereby defining an annular inlet chamber 22. An inlet orifice 23 extends through the wall of the offset portion 21 and communicates with the annular inlet chamber 22, being threaded in the present instance for connection with a supply tube 24. A plurality of radially extending channels 25 in the inner face of the disk 2 lead from the annular inlet chamber 22 to the space 26 between the outer wall of the rim member 16 and the inner wall of the cylinder 4, as clearly shown in the drawings. A plurality of radially extending channels 27 in the inner face of the disk 3 lead from the space 26 to an annular outlet chamber 28 defined by an annular offset portion 29 of the disk 3. An outlet orifice 30 is provided in the offset portion 29 and the passage of a fluid therethrough is controlled by a relief valve 31.

The relief valve 31 comprises a tubular casing 32 reduced at 33 and further reduced at 34 to provide a nipple portion 35. The latter is threaded exteriorly at 36 for connection with the outlet orifice 30. The casing 32 is cylindrical in form adjacent to its upper end and the cylindrical portion thereof is threaded interiorly at 37 for engagement with an exteriorly threaded annular head 38 formed with a central orifice 39 in its upper end. The cylindrical portion of the casing 32 has an inwardly extending annular rib 40 at its lower end which limits the movement of the annular head 38 downwardly. The annular head 38 is fashioned with a plurality of inwardly offset integral depending extensions 41 which depend below the annular rib 40, as clearly shown in Figure 3. The portion of the casing 32 located between the annular rib 40 and the offset portion 33 is fluted in cross section, thereby providing a plurality of vertically extending chambers 42 (see Figure 4). A piston valve 43 is disposed in the reduced portion 33 of the valve casing and is provided with a depending axial extension 44 normally disposed in the nipple portion 35 and with an upwardly extending axial portion 45. A contractile spring 46 is disposed within the valve casing between the piston valve 43 and the upper end of the head 38, whereby the passage of a fluid through the outlet orifice 30 is normally prevented.

From the foregoing description of the various parts of the device, the operation thereof may be readily understood. The conduit 24 is adapted for connection with a suitable source of pressure fluid supply, such as with a reservoir or conduit for compressed air. In practice, means not shown will be provided for controlling the passage of the pressure fluid through the supply conduit 24. The shaft 1 is operatively connected with the rotating part on which the braking action is to be applied. The relief valve 31 is designed to operate at a relatively low pressure. Let us assume that the shaft 1 is rotating and that the rim member 16 is rotating therewith on account of the torque applied to the latter through the spoke members or arms 18 and the springs 19. When it is desired to check the movement of the shaft 1 and of the parts mounted thereon, a pressure fluid such as compressed air is admitted through the supply conduit 24 and fills the radial channels 25, the annular space 26, the radial passages 27, and the annular outlet chamber 28. As soon as a predetermined pressure is attained, the piston valve 43 will be moved upwardly against the action of the spring 46 and the pressure fluid is exhausted through the relief valve 31. When this occurs, the action of the pressure fluid rushing through the passages 25, the annular passage 26, and the passages 27 between the relatively moving cylindrical outer casing and the rotor or cylindrical inner casing therein tends to check the rotation of the rim member 16 of the rotor and finally brings this member to a stop. The spokes or arms 18 of the rotor are permitted to move relatively to the rim member 16 within the limits of the recesses 17. It will be manifest, however, that the springs 19 will retard the movements of the spokes 18 in the recesses 17 and will cushion the impact of the spokes against the sides of the recesses. In consequence, the movement of the spokes 18 will be stopped shortly after the rotation of the rim member 16 has been determined, whereby the shaft 1 will be brought to a stop.

I claim:

1. A device of the character described comprising a supported fluid-tight cylindrical outer casing provided with an inlet port at one end and with an outlet port at its other end, a fluid-tight cylindrical inner casing of less diameter than the inner diameter of the outer casing and supported for rotation in the latter, and means connecting with the inlet for causing a compressed fluid to flow between the outer casing and the inner casing.

2. A device of the character described comprising a supported fluid-tight cylindrical outer casing provided with an inlet port at one end and with an outlet port at its other end, a fluid-tight cylindrical inner casing of less diameter than the inner diameter of the outer casing and supported for rotation in the latter, means connecting with the inlet for causing a compressed fluid to flow between the outer casing and the inner casing, and a relief valve operatively connected with the outlet for regulating the pressure of the fluid within the outer casing.

3. A device of the character described comprising a supported fluid-tight cylindrical outer casing provided with an inlet port at one end adjacent to the center thereof and with an outlet port at its other end adjacent to the center thereof, a fluid-tight cylindrical inner casing of less diameter than the inner diameter of the outer casing and supported for rotation in the latter, and means connecting with the inlet for causing a compressed fluid to flow between the outer casing and the inner casing.

4. A device of the character described comprising a supported fluid-tight cylindrical outer casing provided with an inlet at one end and with an outlet at its other end, an axial shaft journalled in the ends thereof, a fluid-tight cylindrical rotor rigidly mounted on said shaft for rotation within the outer casing, the rim portion of said rotor being movable relatively to the end walls thereof, and means rigidly connected with the end members of the rotor and engaging with the rim member of the rotor for limiting the independent movement of the said rim member.

5. In a device of the character described, a valve comprising a tubular casing open at both ends, said tubular casing being cylindrical adjacent to its ends and fluted intermediately, one of said cylindrical end portions being reduced and threaded exteriorly and the other of said cylindrical portions being threaded interiorly, a head disposed in the last named cylindrical portion, said head being provided with an outlet orifice in its outer end and with a plurality of integral extensions extending beyond its other end into the fluted portion, a piston valve slidably disposed in the reduced cylindrical portion of the casing, said reduced portion being further reduced adjacent to its end to provide a seat for the piston valve, and spring means disposed between the valve and the head for yieldingly resisting movement of the valve toward the head.

SEBASTIAN GIOVANNINI.